(12) United States Patent
Berkey et al.

(10) Patent No.: US 6,337,763 B1
(45) Date of Patent: Jan. 8, 2002

(54) DISTRIBUTED RESONANT RING FIBER FILTER

(75) Inventors: George E. Berkey, Pine City; Liang Dong, Painted Post, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/724,091

(22) Filed: Nov. 28, 2000

Related U.S. Application Data

(62) Division of application No. 09/441,240, filed on Nov. 16, 1999, now Pat. No. 6,192,179.
(60) Provisional application No. 60/117,080, filed on Jan. 25, 1999.

(51) Int. Cl.[7] .............................. H01S 3/06; G02B 6/26
(52) U.S. Cl. ................. 359/337.2; 359/161; 359/341.1; 385/126
(58) Field of Search .............................. 359/161, 337.2, 359/341.1; 385/126, 127

(56) References Cited

U.S. PATENT DOCUMENTS

| 5,067,789 A | 11/1991 | Hall et al. | |
|---|---|---|---|
| 5,131,069 A | 7/1992 | Hall et al. | |
| 5,155,621 A | 10/1992 | Takeda et al. | |
| 5,161,050 A | 11/1992 | Grasso et al. | 359/341 |
| 5,218,665 A | 6/1993 | Grasso et al. | |

FOREIGN PATENT DOCUMENTS

| EP | 0 213 778 A2 | 4/1986 |
|---|---|---|
| EP | 0 566 236 B1 | 5/1993 |
| EP | 0 849 231 A1 | 8/1997 |
| GB | 2179171 | 2/1987 |
| WO | 91/18434 | 11/1991 |

OTHER PUBLICATIONS

A.C. Boucouvalas, G. Georgiou; "Biconical Taper Coaxial Optical Fibre Coupler", Electronics Letters, vol. 21, p. 864, Jul. 31, 1985.

A.C. Boucouvalas, G. Georgiou; "Concatenated, Tapered Coaxial Coupler Filters", IEE Proceedings, vol. 134, Pt. J. No. 3, Jun. 1987.

A.C. Boucouvalas, J.R. Cozens; "Coaxial Optical Coupler", Electronics Letters, Feb. 4, 1982, vol. 18, No. 3.

*Primary Examiner*—Nelson Moskowitz
(74) *Attorney, Agent, or Firm*—Eric M. Smith

(57) ABSTRACT

Disclosed is a fiber optic filter that includes a central core, a ring core concentric with the central core, an inner cladding region of refractive index $n_i$ between the central and ring cores, and a cladding layer of refractive index $n_c$ surrounding the ring core. The maximum refractive index $n_1$ of the central core and the maximum refractive index $n_2$ of the ring core are greater than $n_c$ and $n_i$. The propagation constants of one core mode and one ring mode are different at wavelengths except for at least one wavelength $\lambda_O$ whereby power transfers between the two cores at $\lambda_O$. At least a portion of the fiber optic filter fiber is wound around a reel to subject it to a continuous curvature, the radius of which determines the amplitude of the attenuation. Such fibers are useful in fiber amplifiers in which the central core contains active dopant ions.

2 Claims, 6 Drawing Sheets

DISTRIBUTED RESONANT RING FIBER FILTER

This application is a division of application Ser. No. 09/441,240 filed Nov. 16, 1999 now U.S. Pat. No. 6,192,179 and the benefit of priority pursuant to 35 U.S.C. 517 120 is hereby claimed.

This application claims the benefit of U.S. Provisional Application No. 60/117,080 filed in Jan. 25, 1999.

BACKGROUND OF THE INVENTION

The present invention relates to fiber amplifiers having filter means for attenuating or removing certain specified wavelengths, and to resonant ring fiber filters for use in such amplifiers.

Doped optical fiber amplifiers consist of a gain fiber the core of which contains a dopant such as rare earth ions. The gain fiber receives an optical signal of wavelength $\lambda_S$ and a pump signal of wavelength $\lambda_P$ which are combined by means such as one or more couplers located at one or both ends of the gain fiber. The spectral gain of a fiber amplifier is not uniform through the entire emission band. For example, an erbium doped gain fiber, the gain band of which coincides with the 1550 nm telecommunications window of silica based optical fiber, has an irregular gain spectrum that includes a narrow peak around 1536 nm. Fiber amplifier gain spectrum modification has been employed in fiber amplifiers for such purposes as gain flattening and gain narrowing.

It is known that a gain fiber can include a distributed filter for improving the efficiency of a fiber amplifer and/or tailoring the spectral output thereof. Such a distributed filter/gain fiber has an active ion-doped core that is located along the fiber axis, and it further includes a second, off-axis core that extends parallel to the active ion-doped core. The two cores have different characteristics such as core diameters and/or refractive index profiles. The structure can support at least two core modes, and the propagation constants of the two core modes can be manipulated independently by proper selection of the aforementioned characteristics. The cores can therefore be designed such that their propagation constants are equal at a certain resonant wavelength, $\lambda_O$. At wavelength $\lambda_O$ the fundamental mode of the structure changes from one core to another. Strong power transfer between the two cores can happen only at a narrow band of wavelengths centered about the resonant wavelength. If the second core contains a light absorbing material, it will absorb at least a portion of the light centered about wavelength $\lambda_O$ to provide a filtering function that modifies the fiber amplifier gain spectrum.

It is difficult to make a fiber having two parallel cores because of its lack of circular symmetry. Also, a filter having two parallel cores is polarization dependent.

These disadvantages could be avoided by providing the amplifier with a known coaxial coupler of the type wherein a ring core is concentric with and radially spaced from the central active core to form a device referred to herein as a resonant ring fiber (RRF). At least two modes exist in a RRF. Any mode with most of its power in the core is defined as a core mode, and any mode with most of its power in the ring is defined as a ring mode. The propagation constants of one of the core modes and one of the ring modes of a RRF can be manipulated independently by varying the parameters of the core and ring. The two modes of the RRF structure behave in the same way as the two modes in the parallel core fiber coupler/filter described above, but the RRF is much easier to make using vapor deposition-based conventional fiber fabrication technology; moreover, it is intrinsically not polarization dependent due to its circular symmetry.

In the aforementioned parallel core coupler/filter, differing amounts of power can be attenuated in the off-axis core, depending upon the concentration of light absorbing dopant material contained in that off-axis core. After the parallel core filter is made, the amount of attenuation per unit length therein is fixed. If manufacturing tolerances were such that a predetermined length of fiber did not provide the desired attenuation, it would be desirable to be able to tune the attenuation to the desired value.

SUMMARY OF THE INVENTION

An object of the invention is to improve the efficiency of a fiber amplifier and/or tailor the spectral output of a fiber amplifier. Another object is to provide an improved fiber optic filter. Yet another object is to provide a distributed fiber optic filer, the peak filter wavelength and peak attenuation of which can be readily adjusted. Another object is to provide a temperature stable fiber optic filter.

The present invention relates to a distributed filter formed of an optical fiber having a central core, a ring core having an inner radius $r_R$ concentric with the central core, an inner cladding region of refractive index $n_i$ between the central and ring cores, and a cladding layer of refractive index $n_c$ surrounding the ring core. The maximum refractive indices $n_1$ and $n_2$ of the central and ring cores are greater than $n_c$ and $n_i$. At least a portion of the optical fiber is subjected to a continuous curvature as by winding it into a coil. The propagation constants of one core mode and one ring mode are different at wavelengths except for wavelength $\lambda_O$, whereby a narrow band of wavelengths including $\lambda_O$ is coupled between the central core and the ring core and is at least partially radiated, whereby the narrow band of wavelengths is attenuated.

This technology is especially useful for implementation of distributed loss filters in gain fibers utilized in certain fiber amplifier and laser designs where an appropriate ring core is used in addition to the conventional active ion-doped central core to obtain spectral gain shaping. The ring structure can be designed to provide the appropriate loss for a certain fiber coil size at those wavelengths where the fiber amplifier exhibits amplified spontaneous emission.

The peak attenuation wavelength $\lambda_O$ of a fiber of given outside diameter can be measured, and it may be determined that a fiber having a different value of $r_R$ (and thus outside diameter) will result in the correct value of wavelength $\lambda_O$. Thereafter, the draw blank can be drawn to a fiber having an outside diameter different from the given outside diameter. It may be beneficial to add more cladding material to the original draw blank or to etch some cladding material from the original draw blank prior to drawing the modified resonant ring fiber; these steps could result in a fiber having a different value of $r_R$ and yet retain the given outside diameter. Also, a drawn fiber can be stretched to decrease its outer diameter.

The cladding portions of the fiber can consist of a base glass such as $SiO_2$ and the central and ring cores can comprise $SiO_2$ doped with different amounts of a refractive index increasing dopant such as $GeO_2$ or $Al_2O_3$ to increase the refractive index. The filter can be athermalized by employing an appropriate co-dopant such as $B_2O_3$ together with the index raising dopant to balance out the thermal dependence of the propagation constants of the central and ring cores.

DESCRIPTION OF THE PREFERRED EMBODIMENTS

Figure 1:
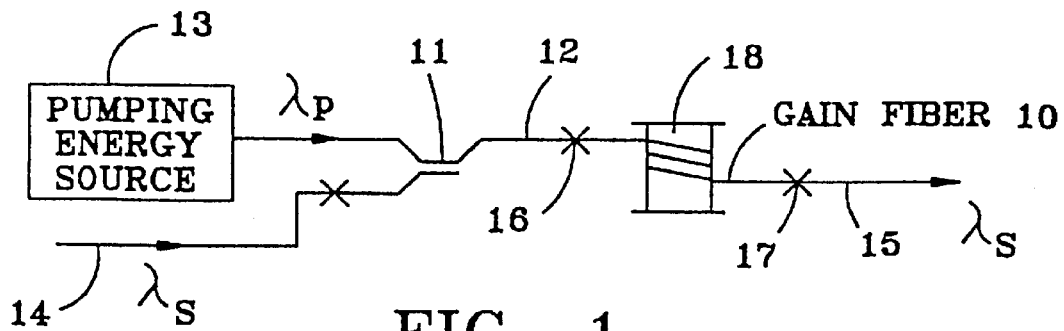
FIG. 1 is a schematic diagram of an optical amplifier using a resonant ring gain fiber.

Fiber amplifiers, in which useful gain is afforded by the stimulated emission of radiation, are employed for the purpose of amplifying a signal propagating in the transmission line fibers of optical transmission systems. The basic structure of a fiber amplifier is schematically illustrated in FIG. 1. A signal of wavelength $\lambda_S$ has become attenuated after propagating through a length of transmission line fiber 14. Such signal is applied to a wavelength dependent multiplexer coupler 11 where it is combined on a single outgoing fiber 12 with pumping energy of wavelength $\lambda_P$ generated by source 13. Fiber 12 is connected by fusion splice 16 to a first end of a gain fiber 10, the central core of which contains active dopant ions. The amplified signal propagates from gain fiber 10 to a single-core transmssion line fiber 15 that is connected to the second end of fiber 10 by fusion splice 17.

Figure 2:
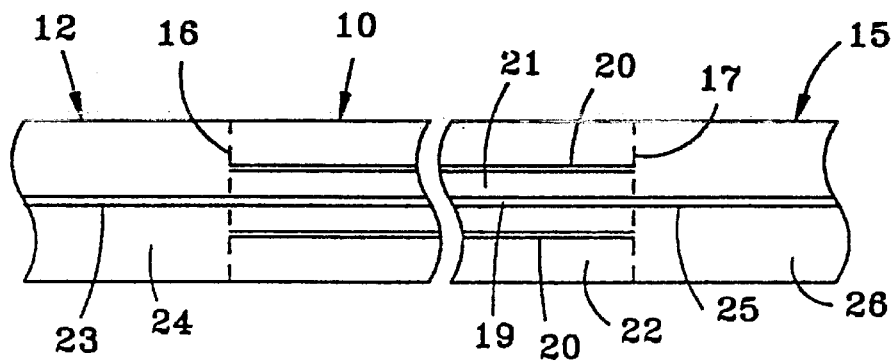
FIG. 2 is an enlarged schematic and fragmentary view of a fusion splice between two single-core fibers and a resonant ring gain fiber.

The portions of fibers 10, 12 and 15 adjacent fusion splices 16 and 17 are shown in FIG. 2. Fibers 12 and 15 are conventional single-core optical fibers. Fiber 12 includes a core 23 surrounded by a cladding layer 24, and fiber 15 includes a core 25 surrounded by a cladding layer 26. Splices 16 and 17 are represented by dashed lines. For the sake of simplicity, protective coatings are not shown. Fiber 10 is a resonant ring fiber having a central core 19 and a ring core 20, the two cores being separated by inner cladding material 21. Fiber 10 also includes a layer of outer cladding material 22. The significance of the resonant ring structure will be discussed below.

Whereas the end-to-end abuttment of fiber 10 with fibers 12 and 15 has been illustrated as being fusion splices, mechanical connectors could also be employed.

Figure 3:
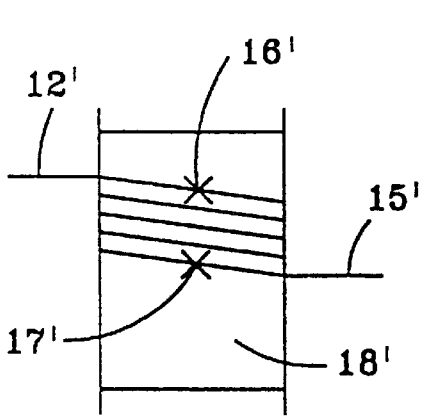
FIG. 3 schematically shows a further embodiment of a coiled resonant ring gain fiber.

FIG. 1 illustrates that fiber 10 is wound upon a reel 18, splices 16 and 17 being illustrated as being located at a distance from the reel. Alternatively, one or both of the splices 16 and 17 could be located on the reel. One such embodiment is shown in FIG. 3 where elements similar to those of FIG. 1 are represented by primed reference numerals. In FIG. 3, splices 16' and 17' are located along the surface of reel 18' whereby the entire length of resonant ring gain fiber 10' is subjected to the curvature of the reel. Short end portions of fibers 12' and 15' are also located on reel 18'.

Figure 4:
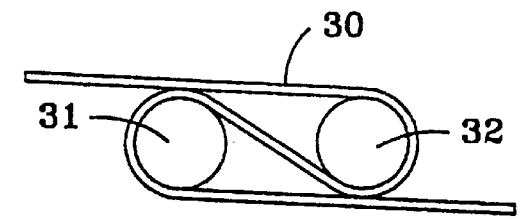
FIGS. 4 and 5 show two structures for imparting continuous curvature to parts of a resonant ring gain fiber.
Figure 5:
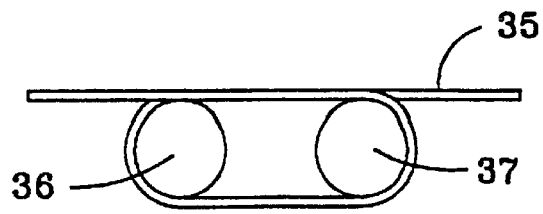

The resonant ring gain fiber could be subjected to curvatures other than circular. For example, a resonant ring fiber 30 could be wound in an S-shaped pattern about two circular supports 31 and 32 as shown in FIG. 4. In the embodiment of FIG. 5, a resonant ring fiber 35 is wound in a "racetrack" pattern about two circular supports 36 and 37.

Although the present invention is useful with various kinds of fiber amplifiers, it will be described in conjunction with an erbium-doped fiber amplifier because of its utility in communication systems. As shown by curve 40 of FIG. 6, the gain spectrum of an erbium-doped fiber amplifier has a narrow peak around 1536 nm and a broad band with reduced gain to about 1560 nm. The 1536 nm peak must be reduced to prevent the occurrence of such disadvantageous operation as wavelength dependent gain or gain (with concomitant noise) at unwanted wavelengths. As will be described more fully below, the coiled, resonant ring aspect of gain fiber 10 provides fiber 10 with a distributed optical filter function that can be designed to attenuate the peak gain of the fiber amplifier. By suppressing the peak gain, the amplifier noise is reduced through reduction of spontaneous-spontaneous beat noise in addition to achieving the desired flat gain spectra required in a wavelength division multiplexing system. Owing to the reduced chance of lasing action from the peak gain, the amplifier can also be designed to operate at much higher population inversion; this can have an additional effect on reduction of noise. This results in the uniform gain spectrum represented by curve 42 of FIG. 6.

Figure 6:
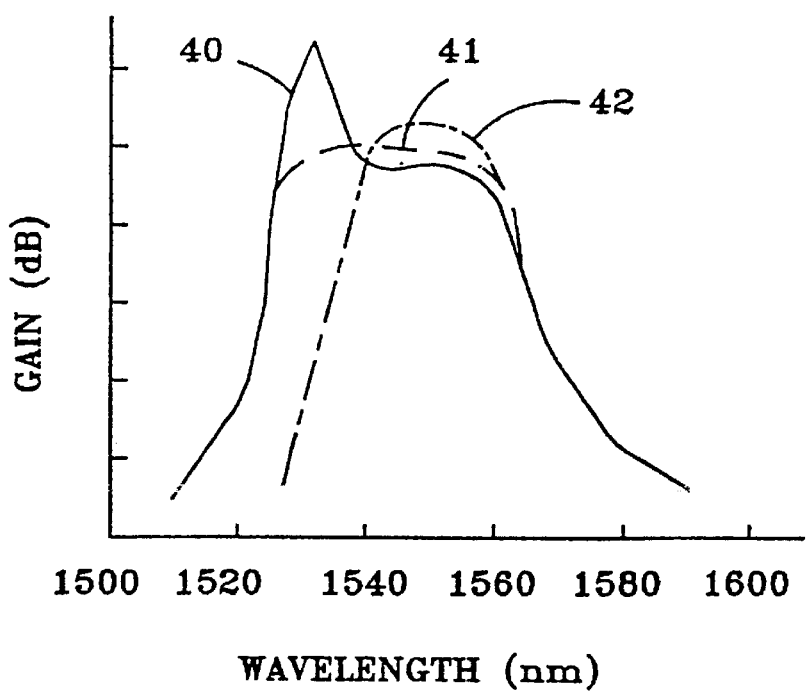
FIG. 6 is a graph showing fiber amplifier gain spectra.

If the curved, resonant ring structure of fiber 10 were designed to attenuate substantially all of the power at 1536 nm, the resultant filtering would essentialy eliminate the shorter wavelengths from the erbium spectral gain curve, thereby resulting in a spectral gain of the type represented by curve 42 of FIG. 6.

As shown in FIG. 2, the resonant ring distributed filter/gain fiber 10 includes a concentric ring core 20 in addition to the central core 19. In the idealized exemplary refractive index delta profile of FIG. 7, central core 48 is separated from ring core 50 by inner cladding 49, which has the same refractive index as outer cladding 51. The refractive index $n_1$ of the central core is less than the refractive index of the ring core, whereby $\Delta_1 < \Delta_2$. The term $\Delta$ is used to indicate the relative refractive index differences between the fiber cores and the outer fiber cladding. Thus, $\Delta_1$ equals $(n_1^2 - n_c^2)/2n_1^2$ and $\Delta_2$ equals $(n_2^2 - n_c^2)/2n_2^2$, where $n_1$, $n_2$ and $n_c$ are the refractive indices of the central core, the ring and the outer cladding, respectively. Moreover, the radal thickness w of the ring core is less than the radius $r_C$ of the central core. The inner radius $r_R$ of the ring core also affects filter characteristics.

Figure 8:
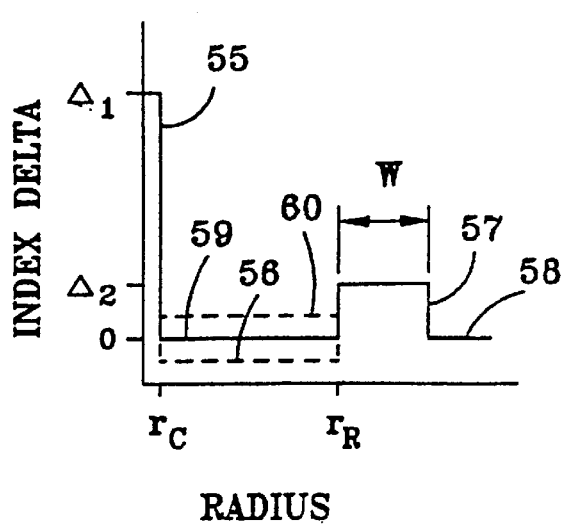

Various other combinations of index deltas and radii could be employed to produce distributed resonant ring filters. In the embodiment of FIG. 8, $\Delta_1 > \Delta_2$, and $w > r_C$. Line 59 shows that the index delta of the inner cladding can be the same as that of the outer cladding (line 58); however, it can be less than or greater than the index delta of the outer cladding as indicated by lines 56 and 60, respectively.

The central core of a resonant ring fiber can support modes having most of their power in the core. The characteristics of the ring core are such that it supports additional modes (LP0$n$) having most of their power in the ring. Within a certain design parameter regime, the two modes change places at the resonant wavelength $\lambda_O$; a mode (LP0$m$) changes from a core mode to a ring mode and a mode (LP0$n$) changes from a ring mode to a core mode at the same time. At this resonance, each of the two modes has substantial power in the core and the ring. This resonance nature of the structure creates a strong wavelength dependent mode field pattern for LP0$n$ and LP0$m$ modes near the resonance wavelength, wherefore resonant ring fibers can be used as spectral filters.

Figure 7:
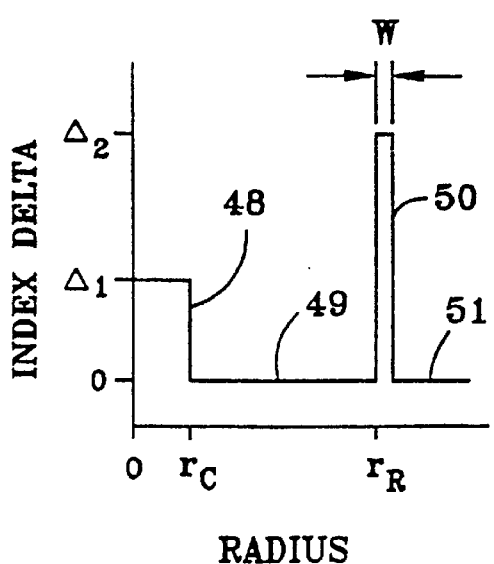
FIGS. 7 and 8 are exemplary refractive index profiles of the resonant ring fiber of this invention.

Consider a structure having a refractive index profile as shown in FIG. 7. With appropriate design, the fundamental mode of the structure can be the only ring mode, the conventional core mode being LP02 mode. As the wavelength is increased, the propagation constant of the ring mode (LP01 at this wavelength) decreases much faster than the core mode (LP02 mode at this wavelength). At $\lambda_O$, there is a transition between the two modes, and for $\lambda > \lambda_O$, the fundamental mode (LP01 mode) becomes the core mode, which now has a higher propagation constant.

To more fully understand the operating principles of the resonant ring filter of the invention, consider the following numerically derived example. It is assumed that the fiber has a refractive index profile of the type illustrated in FIG. 7, wherein $\Delta_1$ is 0.54%, $\Delta_2$ is 2.5%, $r_C$ is 3.83 $\mu$m, $r_R$ is 15 $\mu$m and w is 0.53 $\mu$m.

Figure 9:
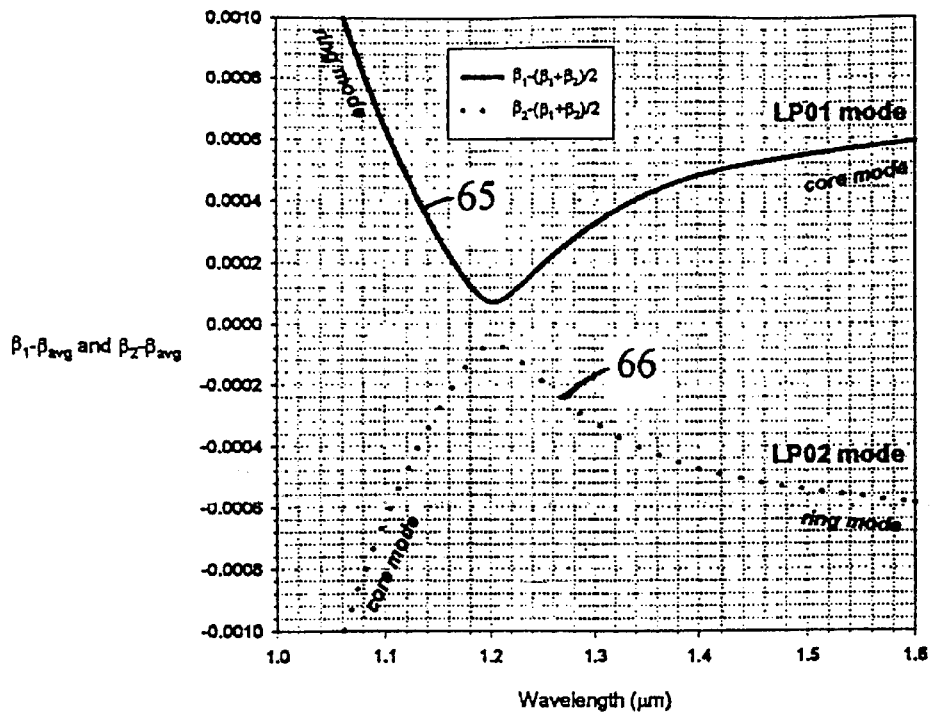
FIG. 9 is a graph illustrating the behavior of the normalized propagation constants of the LP01 and LP02 modes of a resonant ring fiber.

FIG. 9 gives the behavior of the normalized propagation constants of the LP01 and LP02 modes. Solid line curve 65 illustrates the relationship $\beta_1 - \beta_{avg}$, and dotted curve 66 illustrates the relationship $\beta_2 - \beta_{avg}$, where $\beta_{avg}$ is $(\beta_1 - \beta_2)/2$.

Figure 10:
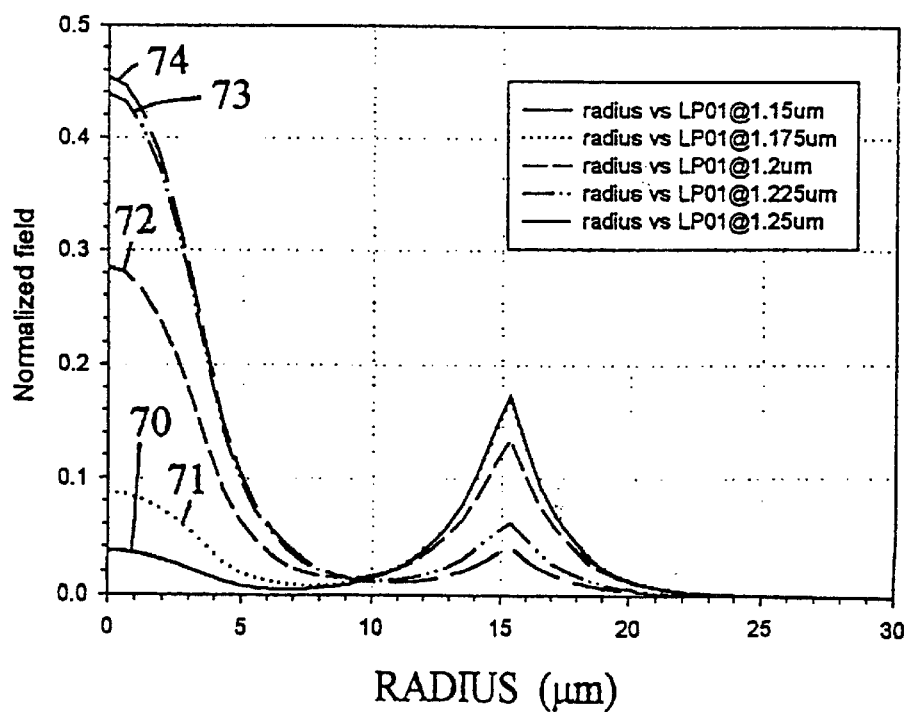
FIG. 10 is a graph illustrating the wavelength dependence of modal field distribution for the LP01 mode.

FIG. 10 gives the transformation of the LP01 mode distribution from ring mode to core mode around the resonance at $\lambda_O$. Curves 70, 71, 72, 73 and 74 show the wavelength dependence of the normalized field for the LP01 mode at wavelengths of 1150 nm, 1175 nm, 1200 nm, 1225 nm and 1250 nm, respectively.

Figure 11:
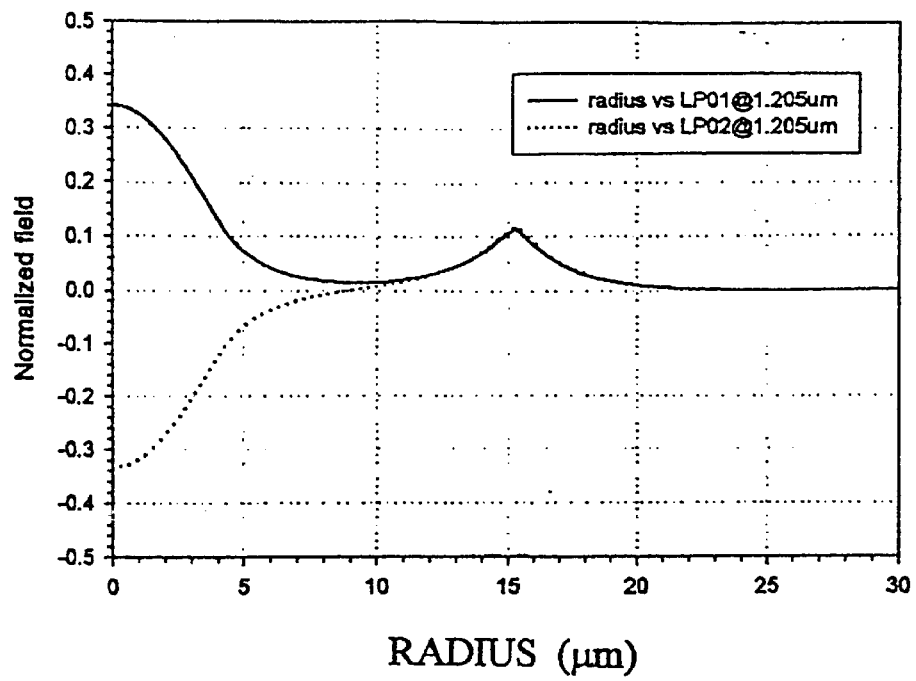
FIG. 11 is a graph wherein normalized field for the LP01 and LP02 modes is plotted as a function of radius at resonance.

The LP01 and LP02 modes are plotted at $\lambda_O$ (1205 nm) in FIG. 11 which shows that each mode has a substantial amount of power over the core and ring. In fact, the amplitude distribution of the field is the same both over the core and ring, with the LP01 mode maintaining a same phase while the LP02 mode maintains an opposite phase over two regions.

At resonance, the modal field diameter is much larger than elsewhere, and therefore, the mode is more prone to bending induced loss. A continuous curvature is applied to the resonant ring fiber as described above to cause a high bending loss for light in a narrow band of wavelengths around $\lambda_O$, but not at other wavelengths. Continuous spectral loss filters of tens of meters in length can be made this way. Filters having bandwidths from a few nanometers to over 100 nanometers can be made by suitable fiber design.

A fiber draw blank can be formed in accordance with the above design criteria; it can be drawn to a resonant ring fiber having a given diameter; and the resonance wavelength at the peak of the loss curve of a drawn fiber can be measured. If necessary, the resonant wavelength can be fine tuned or changed by varying the fiber diameter with its relative internal structure unchanged, such that $\lambda_{O(new)} = R * \lambda_O$ where R is ratio of the fiber diameter change. This diameter change can be done on a fiber drawing tower by drawing the same fiber preform into a fiber having a new outside diameter.

Prior to drawing the modified resonant ring fiber from the original draw blank, more cladding material could be added to the original draw blank, or some cladding material could be etched from the original draw blank.

The diameter of a drawn fiber can be changed by using a set-up similar to that of a fiber optic coupler forming rig to stretch the fiber and thus obtain a constant diameter reduction over a length of fiber.

Resonant ring filters were made with refractive index profiles of the types shown in FIGS. 7 and 8. A FIG. 8 type fiber also included an Er-doped central core.

In one particular resonant ring fiber $\Delta_1$ was 0.38% and $\Delta_2$ was 1.4%. When the fiber was drawn to 125 $\mu$m outside diameter, $r_C$ was 4.85 $\mu$m, $r_R$ was 16 $\mu$m and w was 1.02 $\mu$m; these radii and thickness w were smaller or larger when fibers of smaller or larger outside diameter, respectively, were drawn from the same draw blank. The inner and outer claddings consisted of pure $SiO_2$, the central core was formed of $SiO_2$ doped with approximately 6.1 wt. % $GeO_2$ and the ring core was formed of $SiO_2$ doped with approximately 21 wt. % $GeO_2$. The fiber was formed by well known soot deposition techniques. A central core preform was formed by a technique employed to make conventional step index telecommunications fibers. See U.S. Pat. No. 4,486,212, for example. More specifically, glass particles were deposited on a cylindrical mandrel to form a porous core preform comprising a core region and a thin layer of cladding glass. The mandrel was removed, and the resultant tubular preform was dried and consolidated. The resultant tubular glass article was heated and stretched to close the axial hole and reduce the diameter thereof. Additional layers of silica cladding particles were deposited to the desired thickness and the $GeO_2$-doped $SiO_2$ ring core particles were then deposited, followed by a thin silica layer. After drying and consolidating this preform, the remainder of the outer silica cladding particles were applied and consolidated to form a draw blank from which resonant ring fibers could be drawn.

Figure 12:
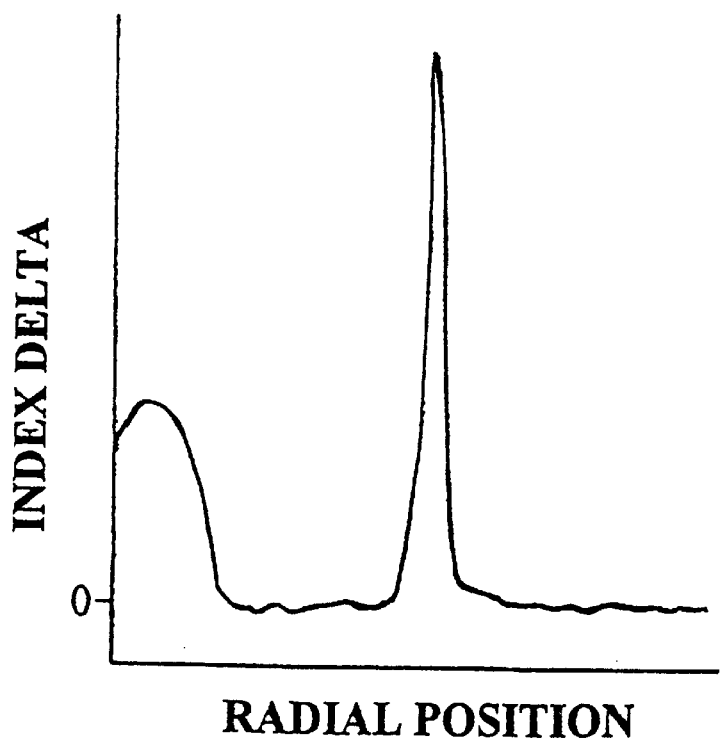
FIG. 12 is a measured refracative index profile of a resonance ring fiber.

Due to the diffusion of $GeO_2$ within the preforms during the manufacture of an optical fiber the actual refractive index profile is different from that represented by FIGS. 7 and 8. As indicated by the plot of FIG. 12, the central core region can have an index depression at the fiber axis, and the outer edge of the core can have an index gradient. Also, the index plot of the ring core can be rounded or even pointed if its thickness dimension w is very small.

Figure 13:
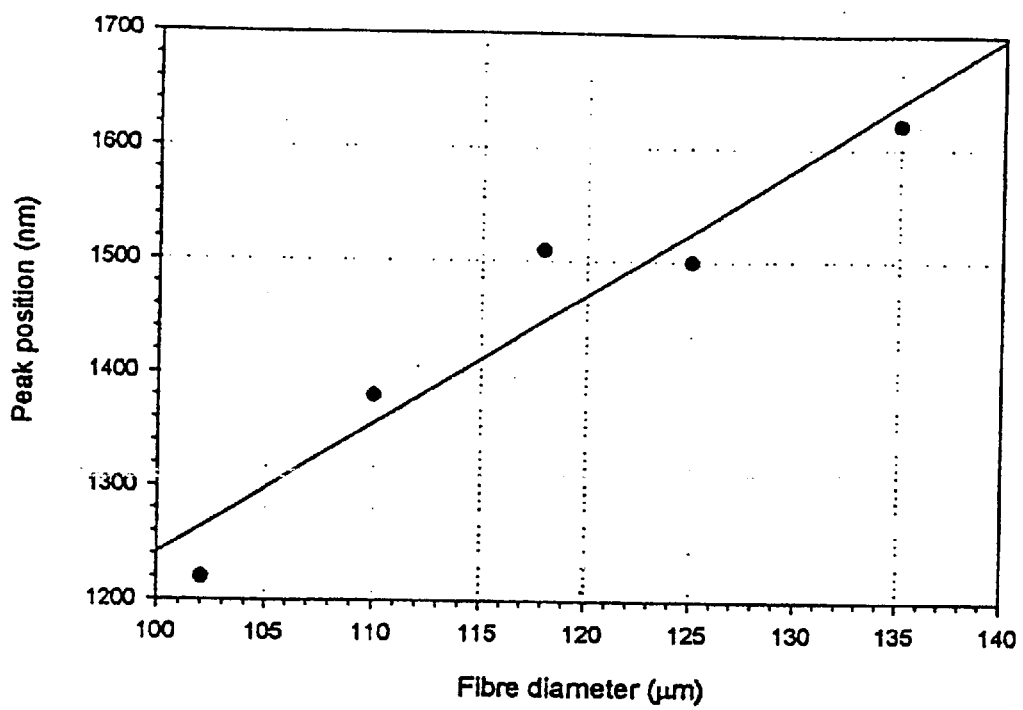
FIG. 13 is a graph illustrating the dependence of resonance wavelength on fiber diameter for a plurality of fibers drawn from the same fiber draw blank.

The aforementioned draw blank was drawn into fibers having different outer diameters to illustrate the effect of core dimensions on filter resonant wavelength. FIG. 13 shows the resonant wavelength position as a function of fiber diameter; this graph illustrates the wide spectral range of filters that can be formed from a single draw blank. The filter that was drawn to an outside diameter of 135 $\mu$m exhibited peak attenuation at a wavelength of about 1620 nm. The same resonant wavelength could have been achieved at a standard outside diameter of 125 $\mu$m if additional cladding material were applied during the manufacture of the draw blank. This additional cladding thickness would make all core dimensions slightly smaller for a given outside diameter.

Figure 14:
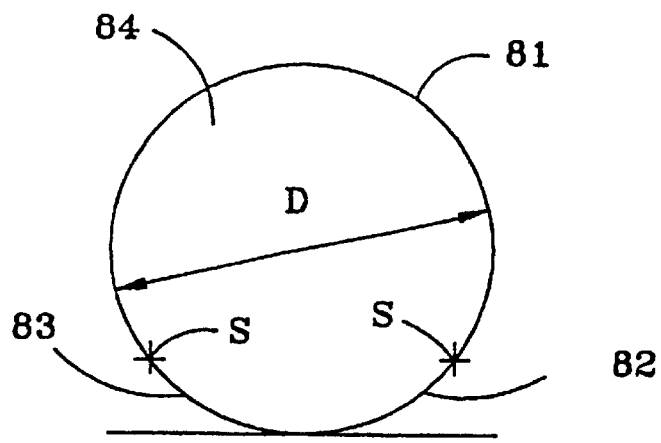
FIG. 14 illustrates an experiment for determining the effect of curvature on attenuation.

FIG. 14 shows an experimental arrangement for determining the effect of subjecting a resonant ring fiber 81 to different curvatures. Fiber 81, which was a 90 mm long piece of the 135 $\mu$m diameter fiber mentioned in conjunction with FIG. 13, was connected to single-core fibers 82 and 83 by fusion splices s. The combination of fibers 81–83 was coiled once around different reels 84 having diameters D ranging from 6 cm to 15 cm. Therefore, the entire length of the resonant ring fiber 81 was subjected to the curvature of reel 84 and functioned as a distributed loss filter.

Figure 15:
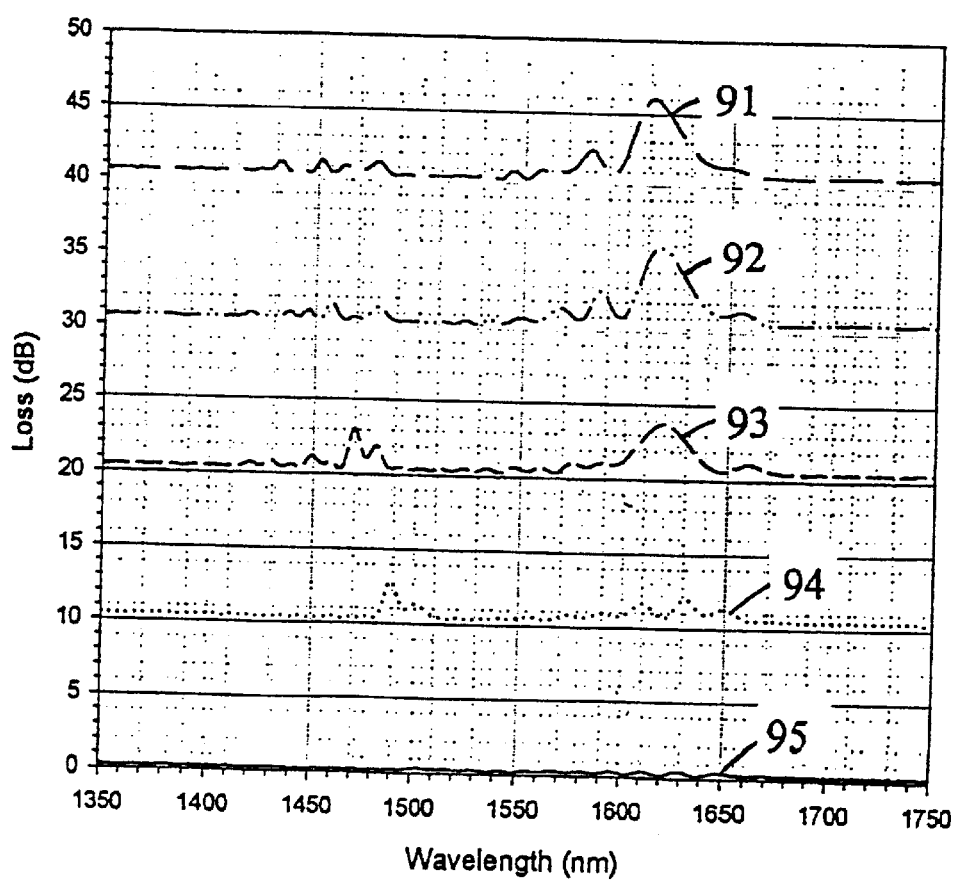
FIG. 15 is a graph illustrating the dependence of filter performance on coil diameter.

A filter response for the different coil diameters is shown in FIG. 15 where curves 91, 92, 93 and 94 represent the spectral loss exhibited by fiber 81 for values of D equal to 6 cm, 6.5 cm, 7 cm and 15 cm, respectively. Curve 95 represents the loss when fiber 81 is not subjected to any curvature. Each of the curves 91–94 is biased 10 dB with respect to the curve below it so that these curves can all be compared on one graph.

It is noted that there is a slight change in $\lambda_O$ at different values of D. Ordinarily, a resonant ring fiber could be numerically designed, and only small changes in D would be employed for tuning purposes, the resultant difference in $\lambda_O$ being negligable. However, if the tuning of the attenuation required a sufficiently large change in D from the design value that $\lambda_O$ was adversely affected, then fiber design parameters would need to be suitably modified to move $\lambda_O$ to the correct value. Having thus modified the fiber design, the problem could possibly be remedied by simply drawing a fiber of different outside diameter from the original draw blank. If this modification did not correct the problem, one could make a new fiber draw blank having slightly different central core and ring core.

It is thus seen that a resonant ring filter can be easily implemented to provide the desired attenuation as well as the desired center wavelength.

The central and ring cores are formed of a base glass such as silica and one or more dopants which are added to the base glass to produce the desired refractive index. There are many known dopants including germania and alumina which, when combined with silica, produce a glass having a refractive index greater than that of silica. A refractive index decreasing dopant such as boron could be employed in combination with the aforementioned index increasing dopants to modify various characteristics of the glass such as thermal coefficient of expansion.

A refractive index increasing dopant such as $GeO_2$ increases the thermal expansion of that portion of the fiber where it is employed. This results in a thermal dependence of the two propagaiton constants. Athermalization of the filter can be achieved by equalizing the thermal dependence of the propagation constants of the two modes involved. One way to achieve this is to use an appropriate co-dopant together with the index raising dopant to balance out the thermal dependence of the two propagation constants. For example, if $GeO_2$ is used to increase the refractive index of $SiO_2$ to form both the central core and the ring core, $B_2O_3$ can be added to the appropriate core to balance out the effect of $GeO_2$. If, for example, the central core contained 8 wt. % $GeO_2$ and the ring core contained 20 wt. % $GeO_2$, then 4 wt. % $B_2O_3$ can be added to the ring to achieve the necessary balance of thermal expansion.

For purposes of athermalizing the device, $B_sO_3$ could be added to both the central core and the ring core. Preferably, the core containing the greater $GeO_2$ content would also have the greater $B_sO_3$ content.

We claim:

1. A fiber optic filter comprising:

an optical fiber having a central core, a ring core concentric with said central core, an inner cladding region of refractive index $n_i$ between said central and ring cores, and a cladding layer of refractive index $n_c$ surrounding said ring core, the maximum refractive index $n_1$ of said central core and the maximum refractive index $n_2$ of said ring core being greater than $n_c$ and $n_i$, wherein the maximum refractive index $n_2$ of said ring core is greater than the maximum refractive index $n_1$ of said central core, the propagation constants of one core mode and one ring mode being different at wavelengths except for at least one wavelength $\lambda_O$, at least a portion of said optical fiber being subjected to a continuous curvature, wherein said central core is a gain core containing active dopant ions that are capable of producing stimulated emission of light, whereby gain is achieved over a given band of wavelengths that includes said wavelength $\lambda_O$.

2. The filter of claim 1 wherein said dopant ions are erbium ions and said wavelength $\delta_0$ is between 1530 and 1540 nm.

* * * * *